United States Patent [19]
Oosterkamp

[11] Patent Number: 5,217,677
[45] Date of Patent: Jun. 8, 1993

[54] CONTROL ROD DRIVE ASSEMBLY

[75] Inventor: Willem J. Oosterkamp, Gelderland, Netherlands

[73] Assignee: General Electric Company, San Jose, Calif.

[21] Appl. No.: 849,545

[22] Filed: Mar. 11, 1992

[51] Int. Cl.$^5$ .............................................. G21C 7/12
[52] U.S. Cl. ...................................... 376/233; 376/316
[58] Field of Search ............... 376/232, 233, 260, 310, 376/316; 976/DIG. 125

[56] References Cited

U.S. PATENT DOCUMENTS

| | | | |
|---|---|---|---|
| 3,627,632 | 12/1971 | Acher et al. | 376/230 |
| 4,518,559 | 5/1985 | Fischer et al. | 376/233 |
| 4,534,932 | 8/1985 | Yoshikawa et al. | 376/316 |
| 5,089,211 | 2/1992 | Dillmann | 376/232 |

OTHER PUBLICATIONS

D. R. Wilkins et al, "Advanced BWR: Design Improvements Build On Proven Technology," Nuclear Engineering International, reprint Jun. 1986, pp. 1–7 and drawing on 6 sheets.

Argonne National Laboratory (ANL), "The EBWR Experimental Boiling Water Reactor," May 1957, pp. Cover and 30–43.

Primary Examiner—Daniel D. Wasil
Attorney, Agent, or Firm—John S. Beulick

[57] ABSTRACT

A control rod drive assembly includes a translatable drive tube joined to a control rod by a coupling having complementary screw threads. A purge flow is channeled between the screw threads to flush away debris therebetween for preventing galling of the threads during operation.

7 Claims, 3 Drawing Sheets

CONTROL ROD DRIVE ASSEMBLY

TECHNICAL FIELD

The present invention relates generally to nuclear reactors, and, more specifically, to a control rod drive assembly therein.

BACKGROUND ART

A conventional boiling water nuclear reactor includes a reactor core disposed inside a pressure vessel and spaced above a lower head thereof to define a lower plenum. Disposed above the core is a steam separator followed in turn by a steam dryer. The vessel is partially filled with water above the reactor core, which water is conventionally circulated through an annular downcomer radially surrounding the core and into the lower plenum wherein it is turned upwardly through the core and heated therein for generating steam.

A plurality of conventional control rod drives are typically disposed below the lower head of the pressure vessel and have drive rods extending upwardly through the lower head and the lower plenum to the reactor core. The drive rods are joined to conventional control rods by conventional bayonet-type couplings which allow individual control rods to be removed. The control rod drives are effective for retracting the drive rods to retract the control rods completely from the reactor core and into the lower plenum. The drive rods may also be extended for positioning the control rods fully into the core between adjacent fuel bundles. Accordingly, the lower plenum must have suitable height for fully receiving the control rods when retracted.

A natural circulation boiling water reactor includes an annular chimney extending from the core upwardly to the conventional steam separators. The chimney provides open space which could be used for retracting the control rods and, thusly, allowing the pressure vessel to be made correspondingly shorter. In the conventional boiling water reactor, the control rods are retracted into the lower plenum, and, therefore, the lower plenum must have sufficient height for containing the retracted control rods. If the control rods could instead be retracted upwardly above the reactor core into the chimney, the lower plenum could be made substantially shorter. In turn, the reactor core could be positioned lower within the pressure vessel, thusly requiring less water inventory within the pressure vessel to keep the core covered with water after a conventional blowdown occurrence.

However, in order to retract the control rod upwardly from the reactor core when the control rod drives are disposed below the reactor core, the coupling between the control rod and the control rod drives must necessarily pass between adjacent fuel bundles within the reactor core. The coupling must be mechanically secure and should allow for replacement of individual control rods as desired. A conventional coupling consists of a bayonet assembly which allows coupling and decoupling of the control rod from the control rod drives. However, the bayonet assembly is relatively large in diameter, and is larger than the spacing between adjacent fuel bundles in a conventional reactor core which therefore prevents retraction of the control rods upwardly above the reactor core.

OBJECTS OF THE INVENTION

Accordingly, one object of the present invention is to provide a new and improved control rod drive assembly.

Another object of the present invention is to provide a control rod drive assembly having an improved coupling between a control rod and a drive rod of the control rod drive.

Another object of the present invention is to provide a control rod drive assembly having a coupling effective for selectively securely joining together a control rod and a drive rod which is sufficiently small for being translated between adjacent fuel bundles for retracting the control rods upwardly above the fuel bundles with the coupling translating between the fuel bundles.

DISCLOSURE OF INVENTION

A control rod drive assembly includes a translatable drive rod in the form of a tube joined to a control rod by a coupling having complementary screw threads. A purge flow is channeled between the screw threads to flush away debris therebetween for preventing galling of the threads during operation.

BRIEF DESCRIPTION OF DRAWINGS

The novel features believed characteristic of the invention are set forth and differentiated in the claims. The invention, in accordance with a preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
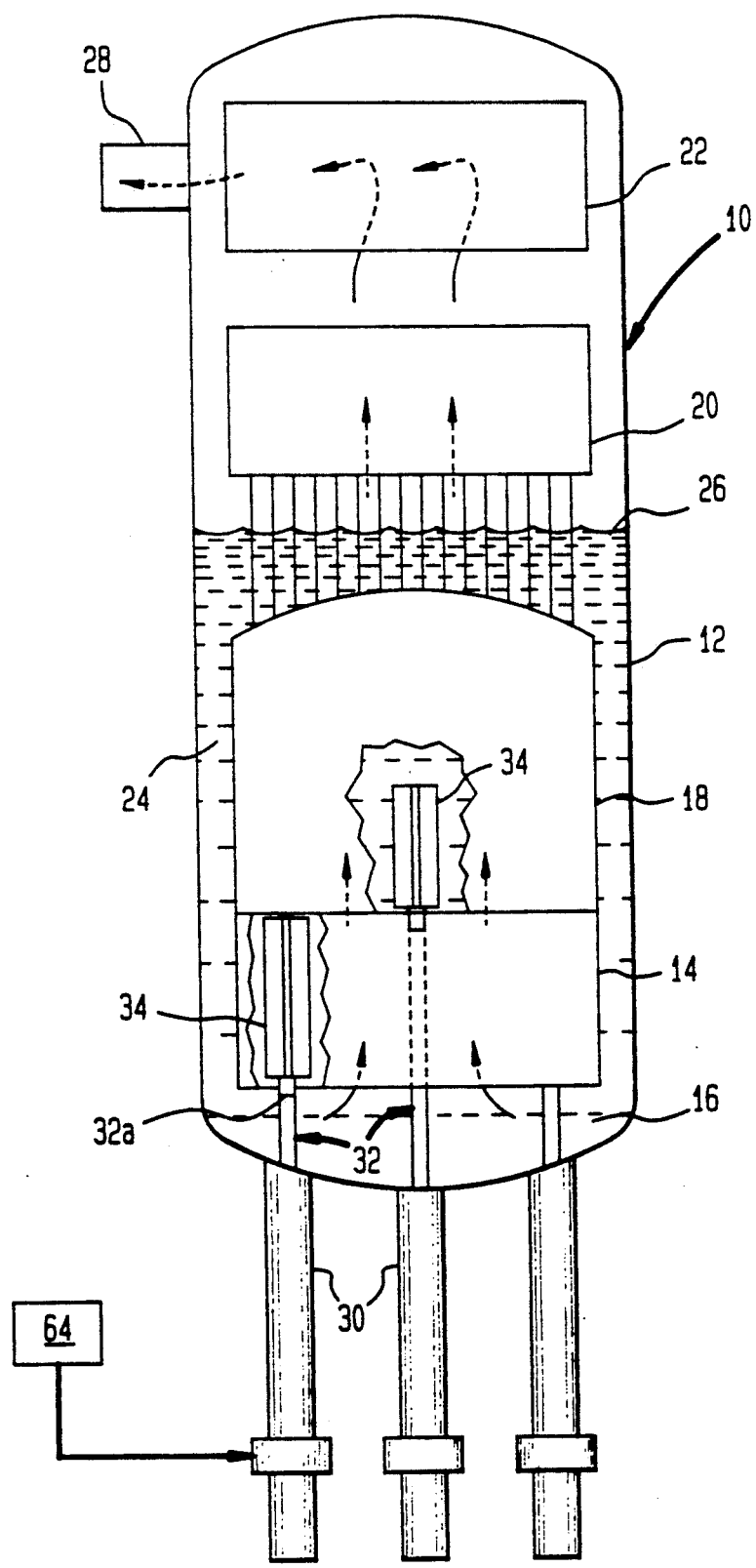
FIG. 1 is a schematic, elevation view of an exemplary boiling water reactor including a control rod drive assembly in accordance with one embodiment of the present invention.

Illustrated in FIG. 1 is a schematic representation of an exemplary boiling water reactor 10. The reactor 10 includes a conventional annular pressure vessel 12 within which is disposed a conventional reactor core 14 spaced vertically above the lower head of the pressure vessel 12 to define a lower plenum 16. Extending upwardly from the core 14 is an annular chimney 18, and a conventional steam separator assembly 20 is disposed above the chimney 18 in flow communication therewith. A conventional steam dryer 22 is disposed above the steam separator assembly 20 below the upper head of the pressure vessel 12.

The chimney 18 and the core 14 are spaced radially inwardly from the annular sidewall of the pressure vessel 12 to define therebetween a conventional annular downcomer 24. The pressure vessel 12 is filled with water 26 to a level above the reactor core 14 and chimney 18, and below the steam dryer 22 at about the midlevel of the steam separator assembly 20.

During operation, the reactor core 14 conventionally heats the water 26 for forming a water/steam mixture which flows upwardly through the chimney 18 to the steam separator assembly 20 wherein moisture is removed therefrom and returned to the downcomer 24, with the separated steam being channeled upwardly to the steam dryer 22 wherein any further moisture is removed therefrom prior to being discharged from a conventional outlet 28 for flow to a conventional steam turbine, for example, (not shown).

The chimney 18 enhances natural recirculation of the water 26 within the pressure vessel 12 by allowing the heated water/steam mixture to rise therein due to its buoyancy. The portion of the water 26 in the downcomer 24, which is cooler than the mixture within the chimney 18, has a higher density and therefore falls naturally within the downcomer 24 to the lower plenum 16. Conventional feedwater spargers (not shown) provide relatively cool makeup water into the pressure vessel 12 in the downcomer 24 which cools the water 26 therein for enhancing the downward circulation thereof.

Also shown in FIG. 1 is a control rod drive assembly in accordance with one embodiment of the present invention which includes a conventional control rod drive (CRD) 30 having a selectively vertically translatable drive rod 32 in the form of a tube. The drive tube 32 includes a distal end 32a joined to a control rod 34 in accordance with one embodiment of the present invention.

Three exemplary ones of the CRDs 30 are illustrated in FIG. 1, with it being understood that many more CRDs 30 are actually used as is conventionally known. A respective number of the control rods 34 are also provided for conventionally controlling operation of the reactor core 14 by being either inserted therein or retracted therefrom. In the preferred embodiment illustrated, the CRDs 30 are disposed below the core 14 and conventionally joined to the lower head of the pressure vessel 12, with the drive tubes 32 extending upwardly from the lower head through the lower plenum 16 to the core 14.

Figure 2:
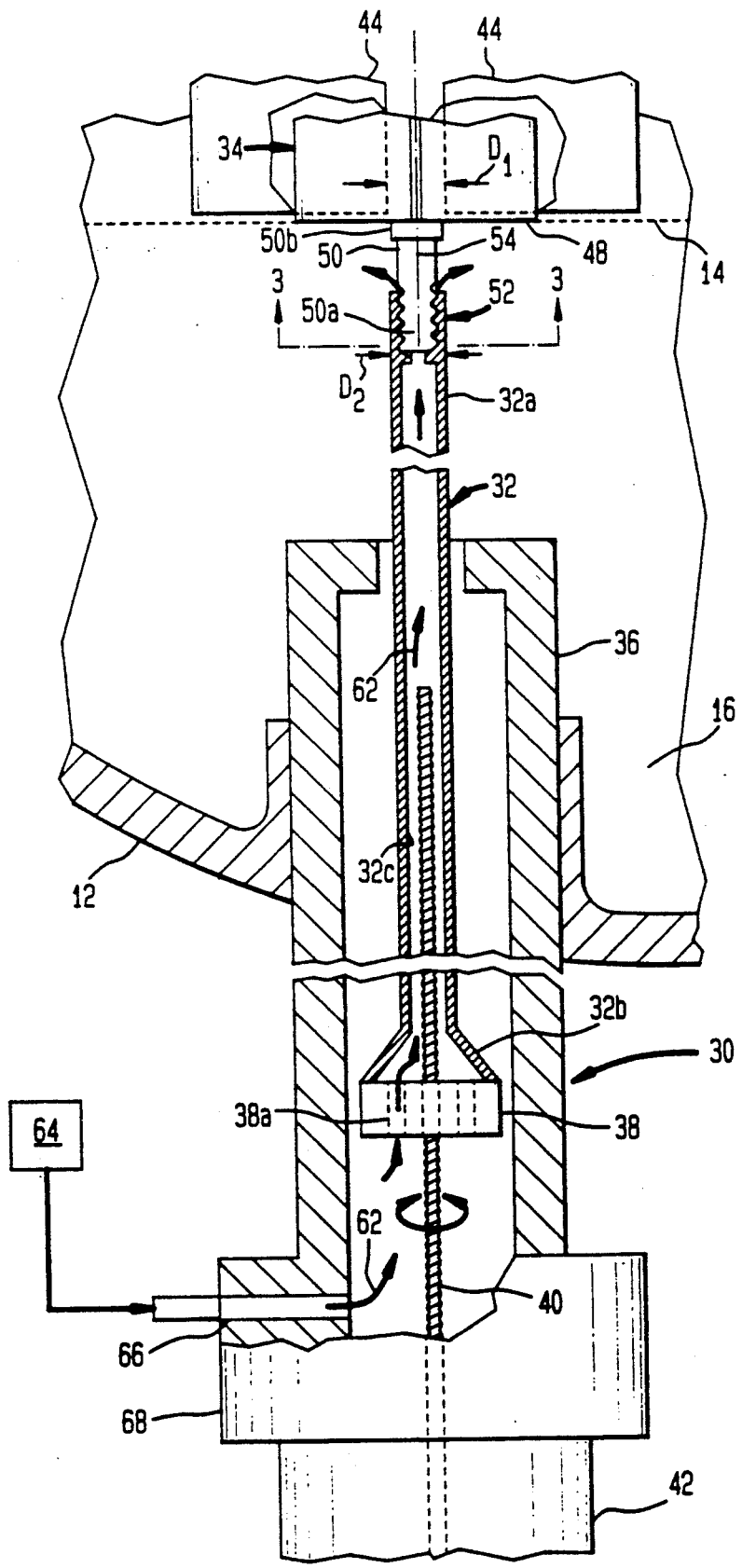
FIG. 2 is an enlarged, partly sectional, elevation view of one of the control rod drive assemblies illustrated in FIG. 1.

An exemplary one of the CRDs 30 is illustrated in more particularity in FIG. 2 and further includes a tubular housing 36 conventionally fixedly joined through the lower head of the pressure vessel 12. Various conventional control rod drives may be used for positioning the drive tube distal end 32a, such as the drive disclosed in U.S. Pat. No. 4,518,559 incorporated herein by reference which is assigned to the present assignee. The drive tube 32 extends through the housing 36, with the distal end 32a extending outwardly from the housing 36 into the lower plenum 16. The drive tube 32 is tubular and includes a proximal end 32b in the conventional form of a piston which rides atop a conventional ballnut 38 inside the housing 36. A conventional threaded spindle 40 threadingly engages the ballnut 38 and extends upwardly into the drive tube 32 and downwardly through the housing 36. The spindle 40 is conventionally joined to a conventional motor 42 which is selectively operable for rotating the spindle either clockwise or counterclockwise as desired.

The ballnut 38 is conventionally restrained from rotating, and the ballnut 38, therefore, translates either upwardly, upon counterclockwise rotation of the spindle 40, or downwardly, upon clockwise rotation of the spindle 40 for example. Since the drive tube proximal end 32b rests atop the ballnut 38, it too is translated in turn as the ballnut 38 is translated. In this way, counterclockwise rotation of the spindle 40 translates the ballnut 38 and the drive tube 32 vertically upwardly into the lower plenum 16 for translating and inserting the control rod 34 upwardly into the core 14. Upon clockwise rotation of the spindle 40, the ballnut 32 and the drive tube 32 are translated downwardly for translating and withdrawing downwardly the control rod 34 from the core 14.

In a conventional reactor, the CRDs 30 would retract the drive tubes 32 downwardly for withdrawing the control rods 34 from the core 14 into a suitably sized lower plenum 16. And, the CRDs 30 would extend the drive tubes 32 upwardly for inserting the control rods 34 into the core 14. However, in accordance with the present invention, the CRDs 30 are operated and sized longitudinally in height so that when the drive tubes 32 are positioned in their retracted positions illustrated in FIG. 2, and in FIG. 1 in the leftmost one of the CRDs 30, the control rods 34 are inserted or positioned fully within the core 14 and between adjacent ones of conventional fuel bundles 44 therein. And, when the drive tubes 32 are in their extended position, as shown for the center one of the CRDs 30 illustrated in FIG. 1, the control rods 34 are retracted or positioned fully above the reactor core 14 and the fuel bundles 44 therein. In this way, the height of the lower plenum 16 may be reduced by up to the amount of height thereof conventionally provided for retracting the control rods 34 below the core 14 in conventional reactors.

Figure 3:
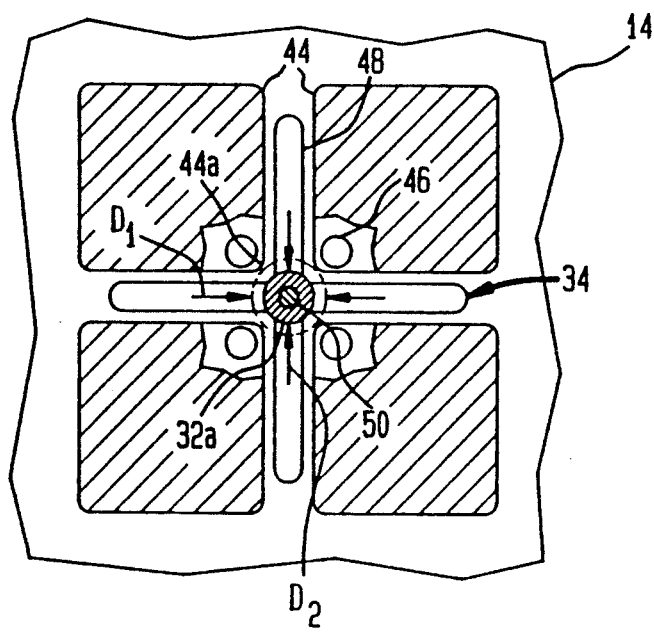
FIG. 3 is a radial transverse, partly sectional, view of a portion of the control rod drive assembly illustrated in FIG. 2 taken along line 3—3.

Referring to FIG. 3, the core 14 conventionally includes a plurality of the fuel bundles 44 arranged in a conventional two-dimensional matrix or array. The fuel bundles 44 are spaced adjacent to each other as tightly as possible to maximize the power output from the reactor core 14 while providing sufficient space for translation of the control rods 34 vertically therebetween. The fuel bundles 44 and the control rods 34 may take any conventional complementary shapes, with exemplary shapes being shown. For example, each of the fuel bundles 44 has a square transverse section in which conventional fuel rods 46 (only one of which is illustrated for each bundle 44) are conventionally disposed in square arrays of 8×8 for example. Each of the fuel bundles 44 includes a corner 44a, and for the four square fuel bundles 44 illustrated in FIG. 3, the four adjacent corners 44a are disposed on a common inner diameter $D_1$ which represents the maximum free space available between the adjacent fuel bundles 44 through which the center of the control rod 34 may pass.

Referring to both FIGS. 2 and 3, each of the control rods 44 conventionally includes a control blade 48 containing conventional nuclear poison, with the blade 44 being conventionally joined to an extension rod 50. The control blade 48 has a conventional branched transverse profile or section which is a cruciform profile for use between the four square fuel bundles 44. Each of the four cruciform branches of the control blade 48 extends between adjacent ones of the fuel bundles 44 in a conventional configuration. In alternate embodiments of the invention, Y-shaped control blades 48 with complementary hexagonal fuel bundles 44 (not shown) could also be used, as well as other conventional configurations thereof.

In a conventional design, the extension rod 50 would be joined to the drive tube 32 by a conventional bayonet coupling (not shown) which has a larger diameter than the common diameter $D_1$ illustrated in FIG. 3, and, therefore, allows the control blade 48 to be withdrawn solely downwardly from the reactor core 14. Withdrawal of the control blade 48 upwardly from the core 14 is prevented by interference between the bayonet coupling and the adjacent fuel bundles 44. However, in accordance with the present invention, a threaded coupling 52 has an outer diameter $D_2$ which is sized less than the common inner diameter $D_1$ for allowing the coupling 52 to be translated between the fuel bundles 44 for withdrawing the control blade 48 upwardly above the core 14 as shown in FIG. 1 upon extension of the drive tube 32.

More specifically, the extension rod 50 includes a distal end 50a and an opposite proximal end 50b, with the extension rod 50 being disposed coaxially about a longitudinal centerline axis 54 of the control blade 48. The coupling 52 joins together the drive tube distal end 32a and the extension rod distal end 50a by complementary screw threads, and the extension rod proximal end 50b is conventionally joined integrally with the control blade 48.

Figure 4:
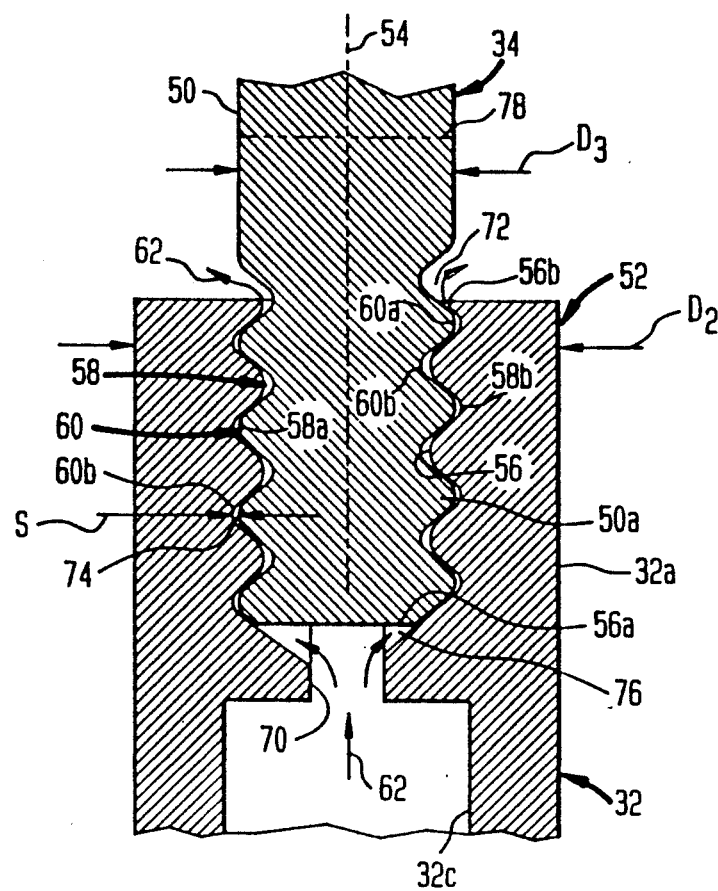
FIG. 4 is an enlarged, longitudinal sectional view of one embodiment of a coupling utilized in the control rod drive assembly illustrated in FIG. 2.

Referring to FIG. 4, the drive tube distal end 32a includes an annular recess 56 extending therein, with the recess 56 having a tubular base 56a at one end thereof inside the drive tube distal end 32a, and an annular mouth 56b at an opposite end thereof facing upwardly toward the control rod blade 48. A conventional internal screw thread 58 is disposed or formed in the recess 56 between the base 56a and the mouth 56b, and a conventional, complementary external screw thread 60 is disposed or formed around the extension rod distal end 50a and threadingly engages the internal thread 58 for removably coupling the control rod 34 at the extension rod 50 to the drive tube 32.

Since the coupling 52 is used in a nuclear reactor, it must provide a secure mechanical connection between the control rod 34 and the drive tube 32 which may be selectively disconnected for replacement of the control rod 34 as desired. The coupling 52 must, therefore, provide for repeated connection and disconnection without undesirable galling which would prevent the removable of a control rod 34 from the drive tube 32. In comparison, a conventional bayonet coupling, although being larger in diameter and more complex, ensures the ability to repeatedly connect and disconnect the control rod 34 from the drive tube 32 without regard to galling.

Accordingly, the internal and external threads 58 and 60 include preferably arcuate or rounded peaks 58a, 60a and valleys 58b, 60b, respectively, for obtaining a secure threaded coupling while minimizing galling between the threads 58, 60 upon repeated coupling and decoupling of the extension rod 50 to the drive tube 32. For example, the internal and external threads 58 and 60 may be conventional Whitworth or British Association standard threads with rounded profiles.

Since the extension rod distal end 50a is threadingly inserted into the drive tube distal end 32a, it has an outer diameter $D_3$ which is preferably less than the outer diameter $D_2$ of the drive tube distal end 32a. The coupling 52 therefore has a relatively small diameter or cross section which allows it to be translated freely between the adjacent fuel bundles 44 as shown in FIG. 3, and therefore the control rods 34 may be retracted upwardly away from the core 14 upon extension of the drive tubes 32 as shown in FIG. 1.

Since the coupling 52 is disposed inside the pressure vessel 12 which contains the water 26, corrosion of the coupling 52 itself, and corrosion particles or debris from other reactor components which is typically found in the vessel 12 should be avoided to reduce the possibility of galling of the threads 58, 60 upon repeated connection and disconnection therebetween. To reduce the likelihood of galling from corrosion debris, the threads 58, 60 themselves are preferably made from a corrosion resistant material such as conventional stainless steel, and the profiles thereof are preferably rounded as above described.

Furthermore, means are also provided for channeling a purge flow of water 62 between the coupling screw threads 58 and 60 to flush away any corrosion or other debris which may find its way therebetween, as well as preventing corrosion debris in the lower plenum 16 from entering the coupling 52. Referring to FIG. 2, the purge flow 62 may be provided from a conventional pressurized water source or pump 64 and conventionally channeled to an inlet aperture 66 extending through a conventional flange 68 disposed between the housing 36 and the motor 42. The inlet aperture 66 is disposed in flow communication with the inside of the housing 36 and channels the purge flow 62 therein. The ballnut 38 may include one or more apertures 38a for channeling the purge flow 62 inside a central bore 32c of the drive tube 32. The purge flow 62 is therefore channeled through the drive tube bore 32c to the drive tube distal end 32a.

Referring to FIG. 4, the drive tube bore 32c extends to the recess 56 and is disposed in flow communication with the base 56a through an aperture 70 therein. The internal and external screw threads 58 and 60 are preferably unsealed and, therefore, will allow the purge flow 62 to flow from the bore 32c and through the aperture 70 for flow between the engaged threads 58, 60 to flush away any corrosion debris which may accumulate therebetween for reducing the likelihood of galling. The pressure of the purge flow 62 within the bore 32c is predeterminedly larger than the pressure of the water 26 within the pressure vessel 12 to ensure that the purge flow 62 is carried outwardly from the drive tube 32 through the recess mouth 56b. In this way, not only are the threads 58, 60 cleaned during operation, but any debris contained in the water 26 within the pressure vessel 12 is prevented from entering into the recess 56 through the mouth 56b thereof.

The threads 58 and 60 may be conventionally free-fitting or loose-fitting threads which provide an effective mechanical joint between the extension rod 50 and the drive tube 32, and which is unsealed for allowing the purge flow 62 to flow therebetween. In a preferred embodiment of the invention, the external thread 60 on the extension rod distal end 50a extends above the recess mouth 56b to define an annular outlet 72 between the internal thread 58 and the external thread 60 for discharging the purge flow 62 therefrom. Also in the preferred embodiment of the invention, the respective peaks and valleys 58a and 60b, and 60a and 58b are spaced apart at a radial distance S to define therebetween a spiral passage 74 for channeling the purge flow 62 through the internal and external threads 58, 60 to flush away any debris therebetween. The passage 74 extends from the outlet 72 at the recess mouth 56b and spirals around the extension rod distal end 50a to the recess base 56a against which the extension rod distal end 50a abuts when coupled to the drive tube distal end 32a. The purge flow 62 may be allowed to simply leak therebetween into the passage 74 since the interface therebetween is not a machined sealed surface, or one or more radially extending, inclined slots 76 may be provided through the base 56a for increasing the flow communication between the aperture 70 and the passage 74.

If during operation, the internal and external threads 58 and 60 become stuck together by galling, the control rod 34 may be conventionally cut away from the drive tube 32 at a cutoff section 78 as shown in phantom in FIG. 4 just above the drive tube distal end 32a and removed. The remaining stud, or extending rod distal end 50a, may then be removed from the recess 56 by conventional techniques including drilling or spark erosion so that the internal threads 58 remain undamaged. A replacement control rod 34 may then be screwed into the recess 56 and suitably translated upwardly and downwardly by the drive tube 32.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

For example, in alternate embodiments of the invention, a reverse embodiment of the coupling 52 could be provided with the recess 56 and internal threads 58 being disposed in the extension rod distal end 50a, and the external thread 60 being disposed around the drive tube distal end 32a (not shown). In embodiments wherein the drive tube 32 itself is too large to pass between adjacent ones of the fuel bundles 44, a suitably smaller diameter extension may be joined thereto and coupled to the control rod extension rod 50 by the coupling 52. In yet another embodiment wherein the minimum outer diameter of the coupling 52 is large for passing between the adjacent fuel bundles 44, the four fuel rods 46 closest the control rod 34 as illustrated in FIG. 3 may be removed for providing a larger diameter space surrounding the drive tube distal end 32a. However, this would require redesigning of the configuration of the fuel bundles 44 which is undesirable. However, for many applications, conventionally configured and spaced apart fuel bundles 44 may be utilized with the relatively small coupling 52 in accordance with the present invention.

Accordingly, what is desired to be secured by Letters Patent of the United States is the invention as defined and diffenentiated in the following claims:

I claim:

1. A control rod drive assembly comprising:
   a control rod drive including a translatable drive tube having a distal end;
   a control rod including a blade joined to an extension rod, said extension rod having a distal end disposed adjacent to said drive tube distal end;
   a coupling joining together said drive tube and said extension rod distal ends by complementary screw threads; and
   means for channeling a purge flow between said coupling screw threads to flush away debris therebetween.

2. A control rod drive assembly according to claim 1 wherein said coupling further includes:
   an annular recess extending into said drive tube distal end, said recess including a base at one end thereof inside said drive tube distal end, a mouth facing said control rod blade, and an internal screw thread disposed in said recess between said base and said mouth; and
   a complementary external screw thread disposed around said extension rod distal end and threadingly engaging said internal screw thread for removably coupling said control rod at said extension rod to said drive tube.

3. A control rod drive assembly according to claim 2 wherein said drive tube includes a central bore disposed in flow communication with said recess base, and said channeling means channel said purge flow through said bore to said recess for flow between said engaged internal and external screw threads.

4. A control rod drive assembly according to claim 3 wherein said external screw thread on said extension rod distal end extends above said recess mouth for defining an annular outlet between said external and internal screw threads for discharging said purge flow therefrom.

5. A control rod drive assembly according to claim 3 wherein said internal and external screw threads have rounded peaks and valleys, and respective peaks and valleys are spaced apart to define therebetween a passage for channeling said purge flow through said internal and external screw threads to flush away debris therebetween.

6. A control rod drive assembly according to claim 5 wherein:
   said control rod blade has a longitudinal centerline axis and a branched transverse profile, and is translatable between a plurality of fuel bundles, each of said bundles having a corner disposed on a common inner diameter; and
   said drive tube distal end has a outer diameter sized less than said common inner diameter for allowing said coupling to be translated between said fuel bundles.

7. A control rod drive assembly according to claim 6 wherein said control rod drive is disposed below said fuel bundles, and said drive tube is positionable in a retracted position for positioning said control rod blade fully between said fuel bundles, and in an extended position for positioning said control rod blades fully above said fuel bundles.

* * * * *